(12) United States Patent
Uy

(10) Patent No.: US 8,938,101 B2
(45) Date of Patent: Jan. 20, 2015

(54) APPARATUS, SYSTEM, AND METHOD FOR REAL-TIME IDENTIFICATION OF FINGER IMPRESSIONS FOR MULTIPLE USERS

(75) Inventor: Ricky Uy, San Francisco, CA (US)

(73) Assignee: Sony Computer Entertainment America LLC, Foster City, CA (US)

(*) Notice: Subject to any disclaimer, the term of this patent is extended or adjusted under 35 U.S.C. 154(b) by 849 days.

(21) Appl. No.: 13/094,399

(22) Filed: Apr. 26, 2011

(65) Prior Publication Data

US 2012/0274598 A1    Nov. 1, 2012

(51) Int. Cl.
   *G06K 9/00*    (2006.01)
   *G06F 3/0488*    (2013.01)
   *G06F 21/32*    (2013.01)
   *G06K 9/68*    (2006.01)

(52) U.S. Cl.
   CPC .............. *G06F 3/0488* (2013.01); *G06F 21/32* (2013.01); *G06F 3/04883* (2013.01); *G06K 9/00006* (2013.01); *G06K 9/685* (2013.01)
   USPC ........... 382/124; 382/115; 382/116; 382/190; 382/224

(58) Field of Classification Search
   USPC ........... 382/115–116, 124, 190, 224; 345/173
   See application file for complete search history.

(56) References Cited

U.S. PATENT DOCUMENTS

| | | | | |
|---|---|---|---|---|
| 5,420,936 A | * | 5/1995 | Fitzpatrick et al. | 382/124 |
| 5,974,163 A | * | 10/1999 | Kamei | 382/125 |
| 6,226,391 B1 | | 5/2001 | Dydyk et al. | |
| 6,229,922 B1 | * | 5/2001 | Sasakawa et al. | 382/209 |
| 7,136,514 B1 | * | 11/2006 | Wong | 382/124 |
| 7,697,729 B2 | * | 4/2010 | Howell et al. | 382/115 |
| 8,009,147 B2 | * | 8/2011 | Chang et al. | 345/173 |
| 8,443,199 B2 | * | 5/2013 | Kim et al. | 713/182 |
| 8,452,978 B2 | * | 5/2013 | Alward et al. | 713/185 |
| 2003/0028872 A1 | | 2/2003 | Milovanovic et al. | |
| 2004/0125993 A1 | * | 7/2004 | Zhao et al. | 382/124 |
| 2006/0095369 A1 | | 5/2006 | Hofi | |
| 2009/0034804 A1 | * | 2/2009 | Cho et al. | 382/116 |
| 2009/0091539 A1 | * | 4/2009 | Do et al. | 345/173 |
| 2009/0109180 A1 | * | 4/2009 | Do et al. | 345/173 |
| 2010/0225607 A1 | * | 9/2010 | Kim | 345/173 |
| 2011/0117526 A1 | * | 5/2011 | Wigdor et al. | 434/118 |
| 2012/0086659 A1 | * | 4/2012 | Perlin et al. | 345/173 |

OTHER PUBLICATIONS

HandsDown: Hand-contour-based—interactive surfaces, Dominik Schmidt et al., ACM, 978-1-60558-934-3, Oct. 16-20, 2010, pp. 432-441.*
International Search Report and Written Opinion for International Patent Application No. PCT/US2012/030477, Mailed Jun. 19, 2012.

* cited by examiner

*Primary Examiner* — Jayesh A Patel
(74) *Attorney, Agent, or Firm* — Blakely Sokoloff Taylor & Zafman

(57) ABSTRACT

Described herein are an apparatus, system, and method for real-time identification of finger impressions for multiple users on a platform. The apparatus comprises a first logic unit to register finger impressions of corresponding multiple users, and to store the registered finger impressions of each user among the multiple users in a storage unit, wherein the finger impressions of the corresponding multiple users are received by a platform; and a second logic unit to identify in real-time active participants according to the registered finger impressions of each user among the multiple users, wherein the active participants are participants of an executing application.

10 Claims, 12 Drawing Sheets

500

Order of comparison from one category to the next for real-time identification of finger impressions →

Order of comparison for each category ↓

| Category A | Category B | Category C | Category D | Category E |
|---|---|---|---|---|
| Arch | Ridge Ending | Flat image | Temp range 1 (cool) | Color range 1 (RGB) |
| Loop | Bifurcation | Roll off right | Temp range 2 (normal) | Color range 2 (RGB) |
| Whorl | Short Ridge (Dot) | Roll off left | Temp range 3 (warm) | Color range 3 (RGB) |

| Category A | Category B | Category C | Category D | Category E |
|---|---|---|---|---|
| Arch | Ridge Ending | Flat image | Temp range 1 (cool) | Color range 1 (RGB) |
| Loop | Bifurcation | Roll off right | Temp range 2 (normal) | Color range 2 (RGB) |
| Whorl | Short Ridge (Dot) | Roll off left | Temp range 3 (warm) | Color range 3 (RGB) |

500

Order of comparison from one category to the next for real-time identification of finger impressions →

Order of comparison for each category →

FIG. 5

APPARATUS, SYSTEM, AND METHOD FOR REAL-TIME IDENTIFICATION OF FINGER IMPRESSIONS FOR MULTIPLE USERS

FIELD OF THE INVENTION

Embodiments of the invention relate generally to the field of computerized user identification. More particularly, embodiments of the invention relate to an apparatus, system, and method for real-time identification of finger impressions of multiple users on an interactive computer platform.

BACKGROUND

As computer devices become more interactive and allow more than one user to interact with an application executing on such computer devices, identifying each user before that user can interact with the executing application is a time consuming process.

FIG. 1 illustrates a computing environment 100 with an interactive touch screen 101 which is configured to interact with four users. Each user of the computing environment 100 is allotted a defined section on the interactive touch screen 101. The defined section, shown by the dotted regions in FIG. 1, is an exclusive section for interacting by a user assigned to its respective defined section. Users of such an interactive touch screen 101 can share the interactive touch screen 101 among themselves by first identifying themselves to the interactive touch screen 101. Users identify themselves by either completing an electronic registration form within their respective exclusive defined sections or by taking turns to register in a defined section of the interactive touch screen 101. Such identification process is time consuming and limits dynamic multi-user interaction experience with the interactive touch screen 101.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

FIG. 5 is a table of categories of information associated with finger impressions that are checked for real-time identification of multiple users, according to one embodiment of the invention.

DETAILED DESCRIPTION

Figure 1:
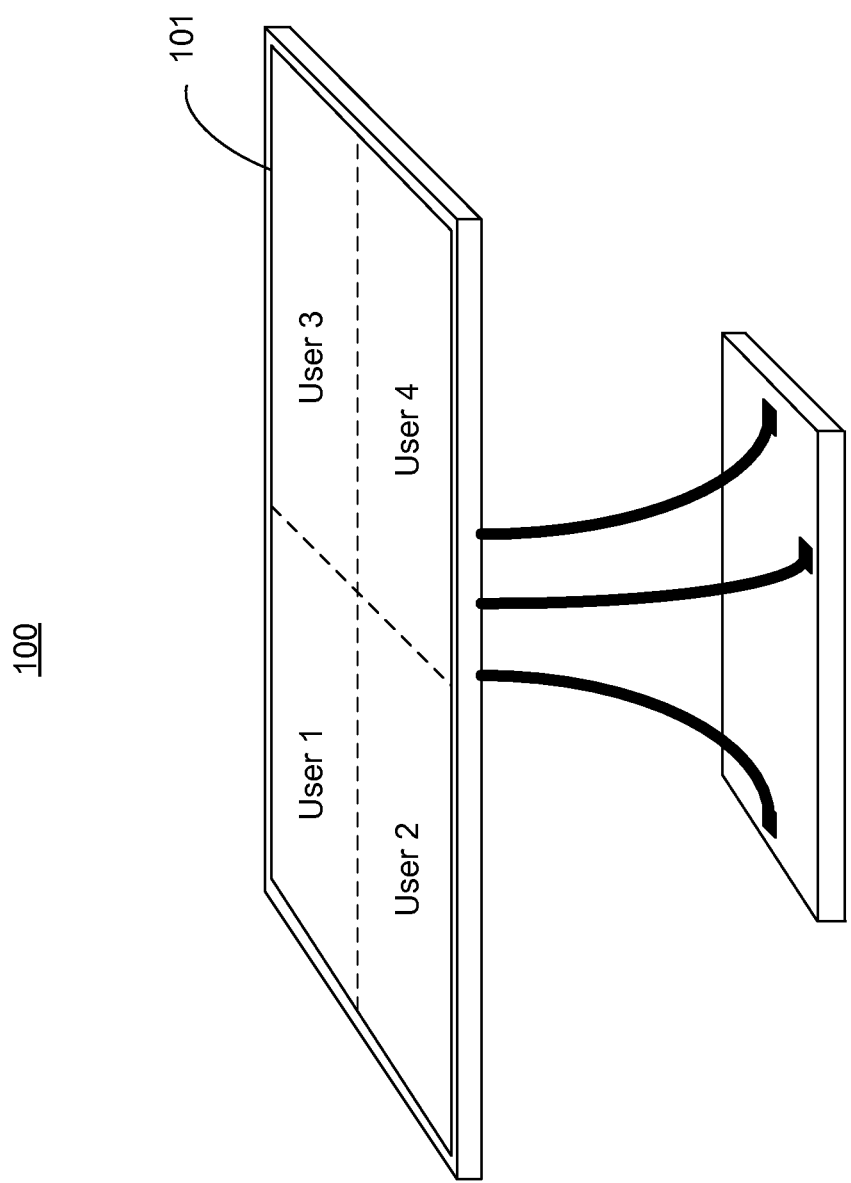
FIG. 1 is a high level computing environment with an interactive touch screen to identify users in a defined section of the touch screen.

Embodiments of the invention relate to an apparatus, system, and method for real-time identification of finger impressions of multiple users on an interactive computer platform. The embodiments of the invention allow multiple users to access in real-time an application via the interactive computer platform. In one embodiment, after registering finger impressions of all users in a database, identification of users is performed by comparing categorized information of finger impressions stored in a small, local, and fast in-memory.

The term "finger impressions" herein refers to fingerprints of the corresponding multiple users, texture of a covering on fingers of the corresponding multiple users, color of the fingers of the corresponding multiple users, or temperature of the fingers of the corresponding multiple users.

The following examples illustrate how the embodiments of the invention may be used. These examples are non-limiting examples for all purposes. For example, a computer game where balloons appear on an audio-visual device or on an interactive computer touch platform and the goal for the users is to touch as many balloons as they can to pop the balloons by means on the interactive computer touch platform. In such an example, no matter who among the registered users touches the interactive computer touch platform to touch the balloons to pop them, the embodiments of the invention recognize the users in real-time and ring in the correct scores (number of balloons popped) for the users playing the game.

In another example, one or more doctors may operate on a patient by means of the interactive computer touch platform. In such an example, the embodiments of the invention will recognize/identify the finger impressions of each doctor and record the role played by each doctor as they touch any part of the interactive computer touch platform. If a doctor is not allowed to operate on a certain part of the patient, that doctor once identified by means of its finger impressions is not allowed to operate on that certain part of the patient. In this example, other doctors may continue to use the interactive computer touch platform to operate on their patient because their finger impressions are identified for performing on that certain part of the patient. Numerous other uses are contemplated and not listed for sake of conciseness.

In one embodiment, the apparatus comprises a first logic unit to register finger impressions of corresponding multiple users, and to store the registered finger impressions of each user among the multiple users in a storage unit, wherein the finger impressions of the corresponding multiple users are received by an interactive computer platform. In one embodiment, the apparatus further comprises a second logic unit to identify in real-time active participants according to the registered finger impressions of each user among the multiple users, wherein the active participants are participants of an executing application.

In one embodiment, the apparatus comprises an in-memory to store a copy, from the storage unit, of the finger impressions of the active participants. In one embodiment, the in-memory can be replaced with any fast access memory. In one embodiment, the second logic unit is operable to identify in real-time active participants via a comparison logic unit 404 which is operable to compare a finger impression of an active participant with a copy of the finger impressions of the active participants in the in-memory. In one embodiment, the comparison logic is operable to compare a finger impression of an active participant with a copy of the finger impressions of the active participants by means of hierarchically categorized information that allows fast comparisons leading to real-time identification of users. In one embodiment, the interactive computer platform comprises a touch pad which is operable to take a photographic image of each finger impression of the finger impressions of the corresponding multiple users.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker to indicate more constituent signal paths and/or have arrows at one or more ends to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme, e.g., differential pair, single-ended, etc.

Figure 2:
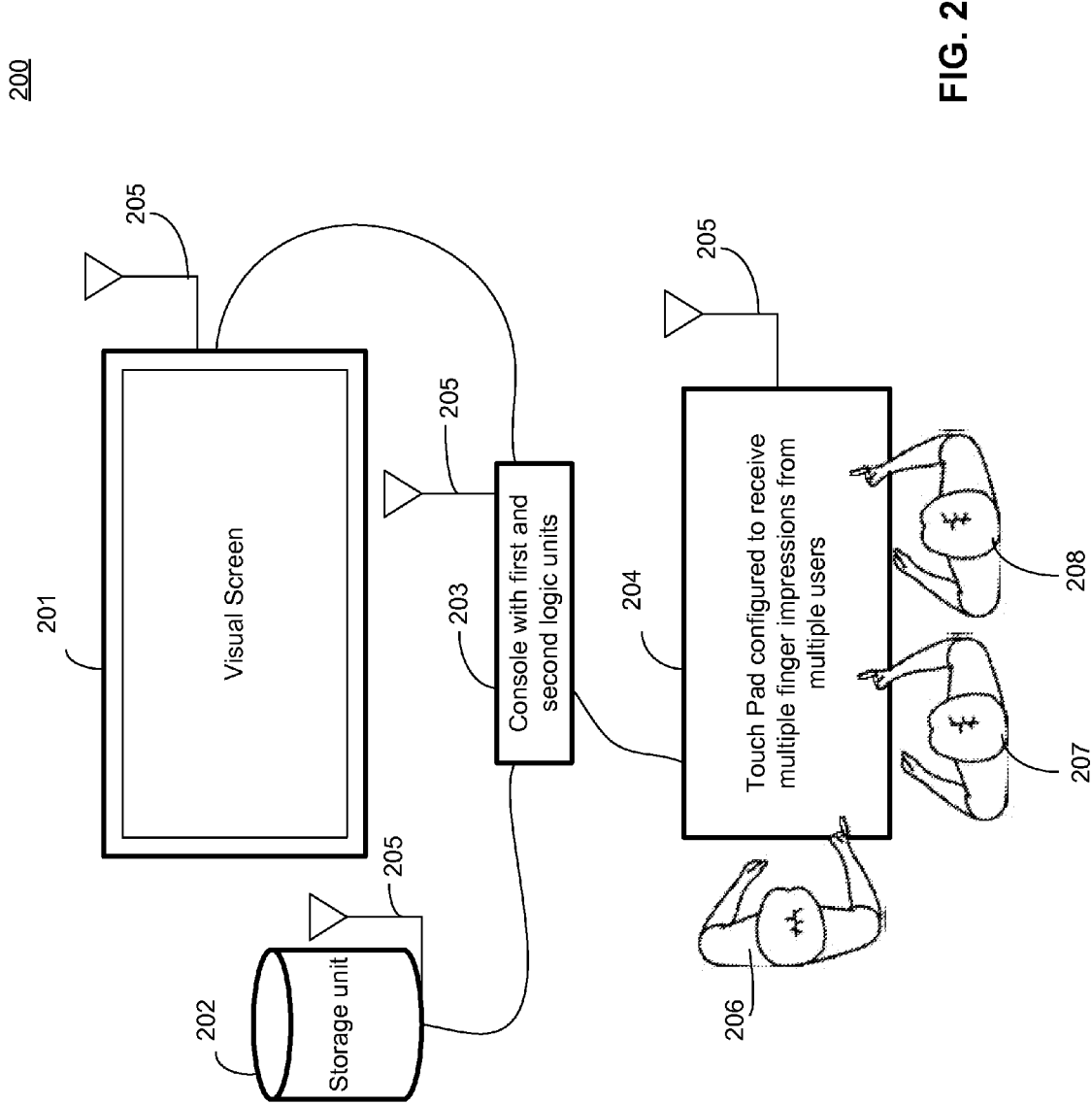
FIG. 2 is a high level computing environment for real-time identification of multiple users on a computer touch platform, according to one embodiment of the invention.

FIG. 2 is a high level computing environment 200 for real-time identification of multiple users 206-208 on a computer touch platform 204, according to one embodiment of the invention. In one embodiment, the computer touch platform 204 is a single computer touch platform. In one embodiment, the computing environment 200 comprises a visual screen e.g., a flat panel display. In one embodiment, the computing environment 200 further comprises a console unit 203 having the first and second units for registering users and identifying them in real-time, and a computer touch platform 204. In one embodiment, some or all the devices discussed herein are operable to communicate with one another via wireless means 205. In one embodiment, the computer touch platform 204 is configured to receive finger impressions of multiple users (206, 207, and 208) at any place on the surface of the computer touch platform 204.

In one embodiment, the computer touch platform 204 is a touch pad that receives information which is displayed on the visual screen 201. In another embodiment, the computer touch platform 204 is a touch screen which is configured to receive finger impressions, identify the finger impressions in real-time, and display an executing program on the same screen as shown in FIG. 3.

Referring back to FIG. 2, the console 203 is operable to process the finger impressions received by the computing touch platform 204, according to one embodiment of the invention. In one embodiment, the console 203 is integrated within the visual screen 201. In another embodiment, the console 203 is an independent processing unit which is not integrated in the visual screen 201. In one embodiment, as discussed in FIG. 3, the processing logic units of the console 203 are integrated in a touch screen.

Referring back to FIG. 2, the console 203 is configured to register the finger impressions received by the computing touch platform 204. In one embodiment, the process of registering comprises categorizing attributes of the finger impressions in a hierarchical view and storing them in a storage unit 202. In one embodiment, the console unit 203 includes a comparison unit to compare a finger impression of any user of the platform 204 with a copy of the categorized information about finger impressions. In one embodiment, the comparison operation is faster than the refresh rate of the visual screen 201. In one embodiment, the comparison operation begins by comparing the finger impression with high level information about finger impressions. If a match is found at such high level, then the user is identified and complex comparing (e.g., comparing exact images of the finger impressions with that of the user's finger impression) is avoided. Such quick comparison causes the users to perceive a real-time identification of finger impressions i.e., seamless identification process to human experience.

Figure 3:
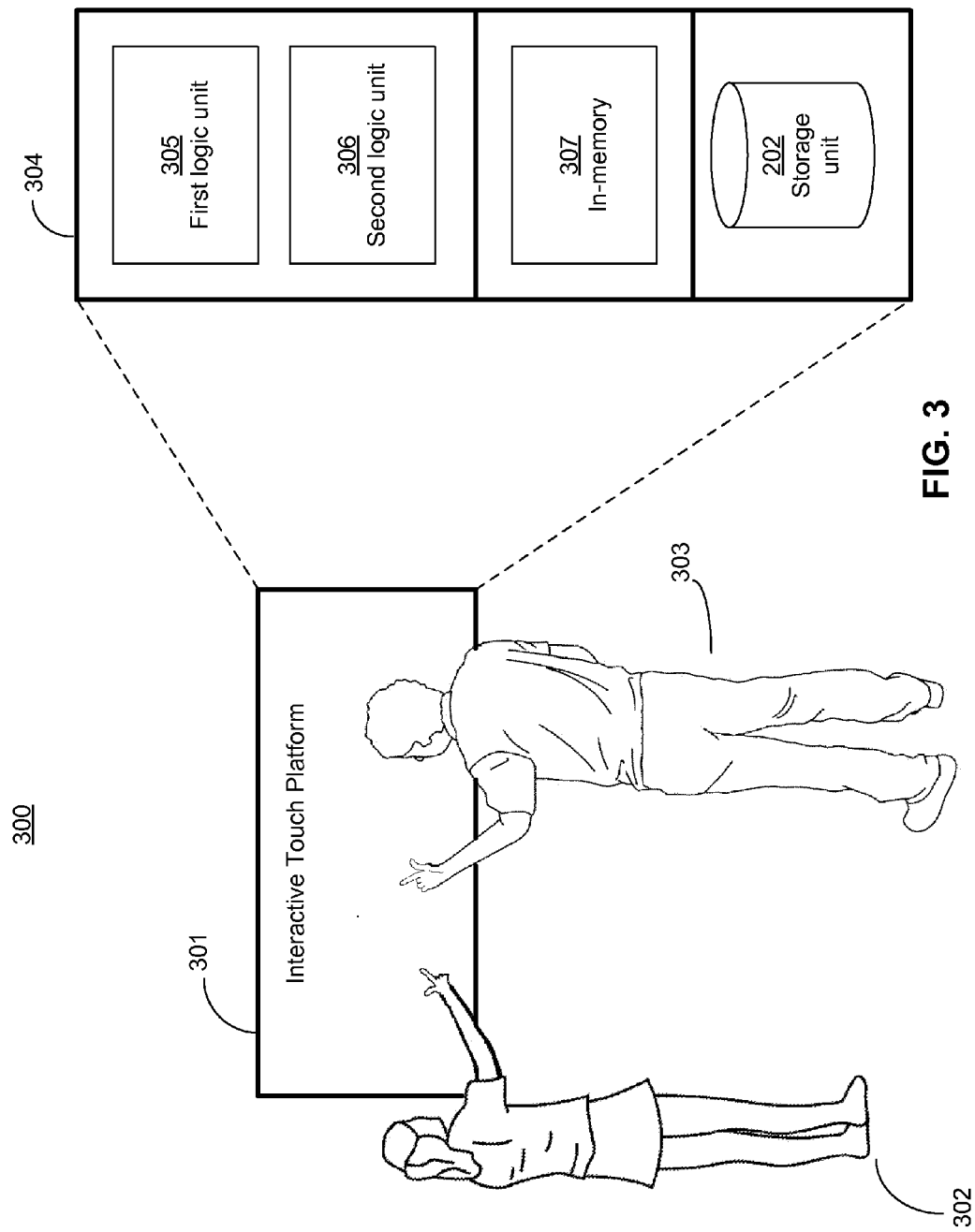
FIG. 3 is a high level computing environment for real-time identification of multiple users on a computer touch platform, according to one embodiment of the invention.

FIG. 3 is a high level computing environment 300 for real-time identification of multiple users 302 and 303 on a computer touch platform 301, according to one embodiment of the invention. In one embodiment, the computer touch platform 301 is a touch screen which is operable to receive finger impressions, take photographic images of the finger impressions, process the finger impressions to identify them in real-time, and display an executing application on the platform 301. In this embodiment, all necessary logic for real-time identification of finger impressions is integrated within the platform 301. Many alternatives, modifications and variations of such embodiments will be apparent to those of ordinary skill in the art in light of the foregoing description. Such alternatives, modifications, and variations are part of the embodiments of the invention.

In one embodiment, the computer touch platform 301 includes sensors (not shown) to receive finger impressions at any physical location on the surface of the computer touch platform 301. In one embodiment, the sensors comprise optical sensors. In other embodiments, the sensors comprise ultrasonic sensors. In one embodiment, the sensors comprise passive capacitance sensors. In one embodiment, the sensors comprise active capacitance sensors. In an alternative embodiment, the sensors comprise a combination of optical, ultrasonic, passive capacitance, and active capacitance sensors. The sensors can be of any other type of appropriate sensor known in the art or otherwise that can capture characteristics of finger impressions.

In one embodiment, the computer touch platform 301 comprises a set of logic units 304 including: a first logic unit 305, a second logic unit 306, a fast access memory 307, and a storage unit 202. In one embodiment, the first logic unit 305 is operable to register finger impressions of the users 302 and 303. In one embodiment, the first logic unit 305 is configured to classify characteristics of the finger impressions of the users 302 and 303 and then to store the classified characteristics in the storage unit 202.

In one embodiment, the first logic unit 305 is configured to classify characteristics of the finger impressions as a first category of information having types of patterns of the finger impressions; a second category of information having unique features of the types of patterns of the finger impressions; and a third category of information having complete photographic images of the finger impressions. The three categories of information is not an exclusive list of categories of information. In one embodiment, the finger impressions received by the computer touch platform 301 are classified in additional categories as shown in FIG. 5.

Referring back to FIG. 3, in one embodiment the first category of information having types of patterns of the finger impressions include Arch, Loop, and Whorl type patterns of the finger impressions. In one embodiment, the second category of information having unique features of the types of finger impressions include features such as ridge ending, bifurcation, dots, short ridge, etc. In one embodiment, the third category of information having complete photographic images of the finger impressions includes flat images and rolled off images of the finger impressions. Flat images of the finger impression are taken when the user finger is pressed flat on the computer touch platform 301. Rolled off images of the finger impressions are taken when the user finger is rolled right and/or left along the surface of the computer touch platform 301.

In one embodiment, the first logic unit 305 is configured to generate a database of finger impressions for every finger impression of a user of the computer touch platform 301. In one embodiment, the first logic unit 305 is also configured to classify a single finger impression per user or multiple finger impressions for a single user.

In one embodiment, the second logic unit 306 is operable to identify a user by means of comparing the user's finger impression with that of the stored finger impressions in the storage unit 202. In one embodiment, the second logic unit 306 is operable to use any known fingerprint recognition algorithm to identify a user's finger impression. In one embodiment, the second logic unit 306 makes a copy of the finger impression of a registered user finger impression and stores the copy in a fast access memory 307. In one embodiment, the fast access memory 307 is an in-memory. In other embodiments, other fast access memories may be used without changing the essence of the embodiments of the invention. The operations of the first and second logic units 305 and 306 are discussed in more detail with reference to FIGS. 4-5, and FIGS. 7-10.

Figure 4:
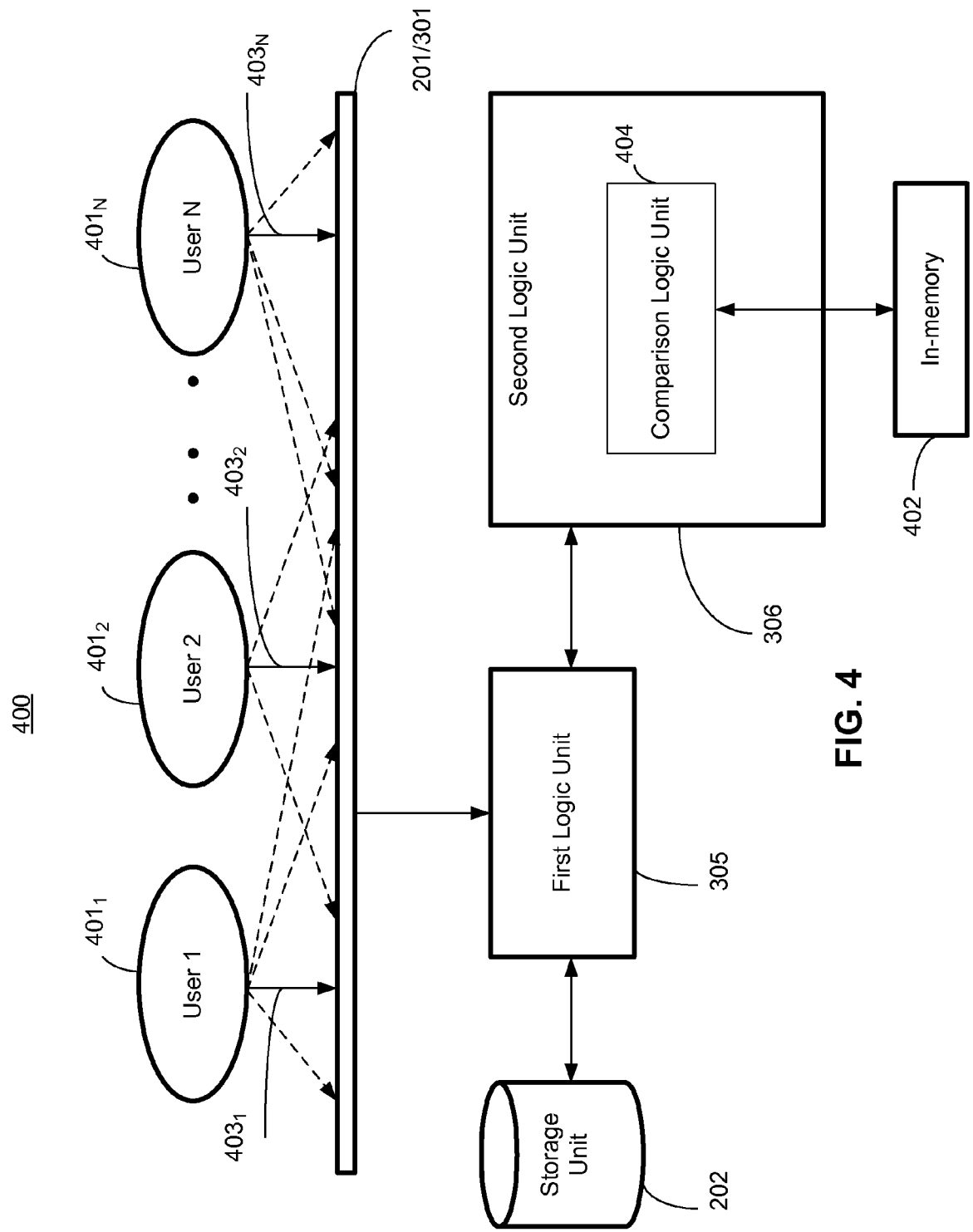
FIG. 4 is an illustration of lower level logic components for identifying finger impressions in real-time of multiple users on a computer touch platform, according to one embodiment of the invention.

FIG. 4 is an illustration of lower level logic components 400 for identifying finger impressions in real-time of multiple users $401_{1-N}$ on a computer touch platform 201/301, according to one embodiment of the invention. The embodiments discussed herein are applicable to any computer touch platform that is configured to receive multiple user finger impressions, sequentially or simultaneously. In the embodiment of 400, the users $401_{1-N}$ place their respective fingers $403_{1-N}$ on the computer touch platform 201/301. The dotted arrows represent that the users $401_{1-N}$ can place their fingers at any physical location of the surface of the computer touch platform 201/301 and are not limited to defined exclusive regions as discussed with reference to FIG. 1.

Referring back to FIG. 4, in one embodiment the finger impressions from each user from among the users $401_{1-N}$, which are received by the computer touch platform 201/301, is registered by the first logic unit 305 as discussed with reference to FIG. 3. In one embodiment, the first logic unit 305 classifies the finger impressions based on various characteristics of the finger impression. In one embodiment, the classified characteristics are stored by the first logic unit 305 in the storage unit 202.

In one embodiment, the second logic unit 306 is operable to identify/recognize a finger impression in real-time of a user. In one embodiment, the second logic unit 306 is operable to store a copy, from the storage unit 202, of the finger impressions of the active participants to a fast access memory 402.

The term "active participant" herein refers to participants (users) of an executing application as opposed to a "passive participant" that may be registered by the first logic unit 305, but is not interacting with an executing application.

In one embodiment, the copy of the finger impressions is organized in a hierarchical view for fast search. In one embodiment, the hierarchical view comprises categories of information similar to the ones made during the process of registration of the finger impressions. FIG. 5 illustrates five categories of information that are organized from left to right and top to bottom in a hierarchical fashion for fast search leading to real-time identification of finger impressions.

Referring back to FIG. 4, in one embodiment the fast access memory is an in-memory. In one embodiment, the second logic unit 306 comprises a comparison logic unit 404 which is operable to compare a finger impression of an active participant with a copy of the finger impressions of the active participants in the in-memory 402. In one embodiment, the comparison logic unit 404 is configured to perform finger impression recognition by matching a finger impression of an active participant with the registered finger impressions stored in the storage unit 202 or with a copy of finger impressions stored in the fast access memory 402. In one embodiment, the comparison logic unit 404 is operable to perform fingerprint recognition by means of any type of algorithms including pattern-based algorithms and minutia-based algorithms.

In one embodiment, the first and second logic units 305 and 306 are implemented as software. In another embodiment, the first and second logic units 305 and 306 are implemented as hardware. In one embodiment, the first and second logic units 305 and 306 are part of a processor and are configurable via software.

In one embodiment, the comparison logic unit 404 applies a pattern-based algorithm on the received finger impression by comparing the received finger impression with a first category of information having patterns of registered finger impressions. In one embodiment, the comparison logic unit 404 is operable to compare the finger impression of the active participant with one or more categories of information comprising: a first category of information having types of patterns of the active finger impressions; a second category of information having unique features of the types of patterns of the finger impressions, wherein the second category of information is compared with the finger impression in response to no match being found in the first category of information; and a third category of information having complete photographic images of the finger impressions, wherein the third category of information is compared with the finger impression in response to no match being found in the second category of information, the third category.

FIG. 5 is table 500 of categories of information/characteristics (Categories A-E) associated with finger impressions that are checked for real-time identification of multiple users, according to one embodiment of the invention. While five categories are illustrated in the table 500, fewer or more categories may be classified for fast real-time identification of multiple users. In one embodiment, the order of comparing a finger impression of an active participant with that of the stored copy of finger impressions is from right to left and top to bottom. In other embodiments, other orders of comparing may be performed by the second logic unit 306.

In one embodiment, the first category (Category A) of information having types of patterns of the finger impressions include: Arch, Loop, and Whorl type patterns of the finger impressions. In one embodiment, the second category (Category B) of information having unique features of the types of finger impressions include features such as ridge ending, bifurcation, dots, short ridge, etc. In one embodiment, the third category (Category C) of information having complete photographic images of the finger impressions includes flat and rolled off images of the finger impression. Flat images are taken when the user finger is pressed on the computer touch platform 301. Rolled off images of the finger impressions are taken when the user finger is rolled right and/or left along the surface of the computer touch platform 301.

In one embodiment, the fourth category (Category D) of information having temperature information includes temperate ranges (cool, normal, warm) of the user's fingers. In one embodiment, cool temperature range is from 95 degree Fahrenheit and below. In one embodiment, normal temperature range is from 96-99 degree Fahrenheit. In one embodiment, warm temperature range is 100 degree Fahrenheit and above. In one embodiment, temperature sensors (not shown) are also incorporated within the computer touch platform 201/301 and calibrated to account for heat generated by the computer touch platform 201/301 itself.

In one embodiment, the temperature sensors are regularly distributed within the computer touch platform 201/301 and are configured to determine the temperature of the fingers at various locations along the fingers. In one embodiment, an average temperature is determined for a finger and/or for a user hand by computing an average of temperatures sensed at the various locations of the finger and/or hand of the user. This average temperature is then compared by the second logic unit 306 with the Category D information. In one embodiment, the second logic unit 306 performs temperature matching with Category D information prior to matching types of patterns in Category A information to determine the identity of the user.

In one embodiment, the temperature sensor comprises thermal diodes coupled to a band-gap circuit to sense a temperature change. This temperature change is then input to an analog-to-digital converter (ADC) to determine a digital value corresponding to the sensed temperature. The digital value is then translated into a readable temperature which is the temperature used for comparing with the temperatures in the Category D information. Other appropriate temperature sensors known in the art may also be used to capture a person's temperature finger/hand impression to identify the user.

In one embodiment, the fifth category (Category E) having color information includes types of color of the finger impressions. In one embodiment, the type of color of the finger impression is represented by Red, Green, and Blue (RGB) values of the color. In one embodiment, other color coding is used to classify various colors of the finger impressions without changing the essence of the embodiments of the inventions. In one embodiment, the second logic unit 306 performs color matching with Category E information prior to matching types of patterns in Category A information to determine the identity of the user.

In one embodiment, the computer touch platform 201/301 is configured to take a photographic picture of the finger impression. In one embodiment, the color information is determined from the photographic picture of the finger impression. In other embodiments, color sensors known in the art may also be used to capture a person's color finger/hand impression to identify the user.

In one embodiment, the order in which the comparison logic unit 404 of the second logic unit 306 compares a characteristic of the finger impression is programmable. For example, Category E information may be the first information that the comparison logic unit 404 compares with for a scenario where every user has a distinct finger impression color. In such an embodiment, a quick check by the second logic unit 306 of the color information can determine the identity of the user without the extensive computations to compare the finger impression with a photographic image.

Figure 6:
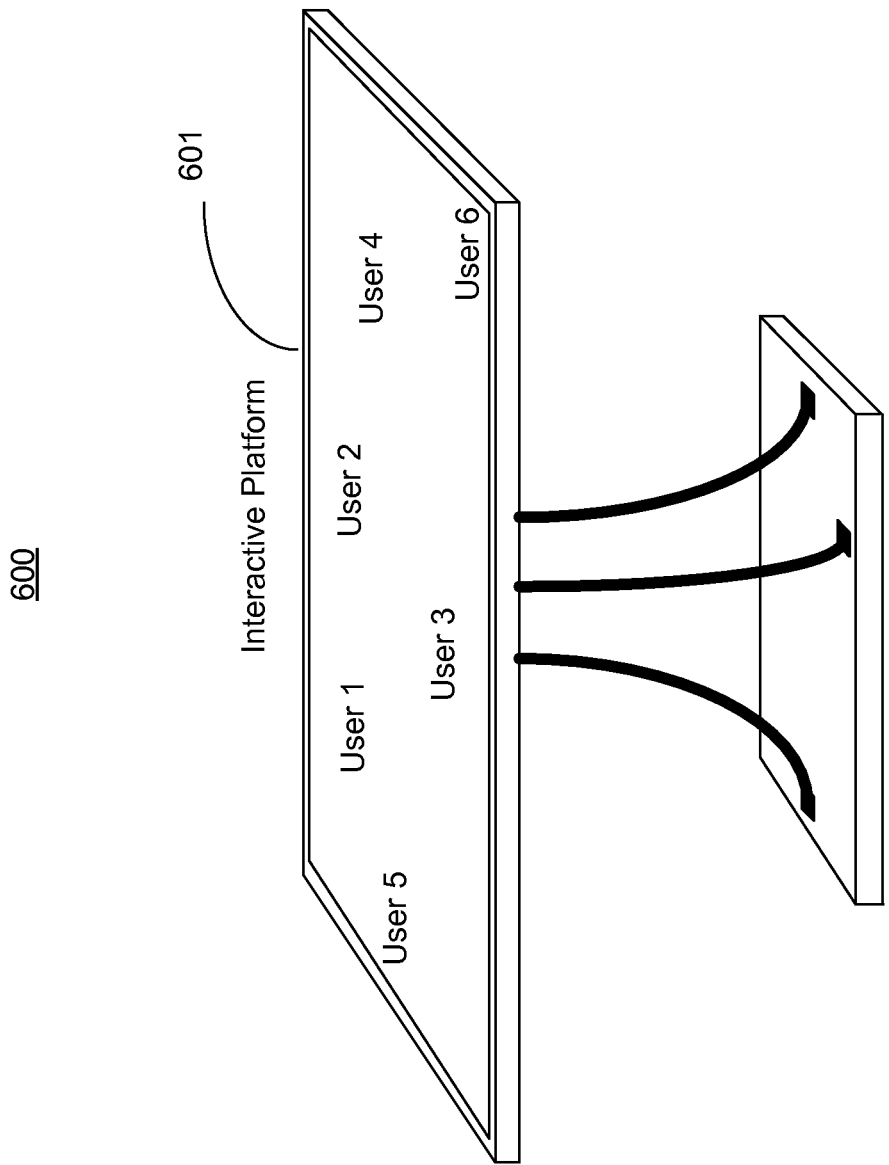
FIG. 6 is a high level computing table environment for real-time identification of multiple users on a computer touch platform, according to one embodiment of the invention.

FIG. 6 is a high level computing table environment 600 for real-time identification of multiple users on a computer touch platform, according to one embodiment of the invention. In one embodiment, the computer touch platform 201/301 is configured as a table 601. Multiple users can interact with one another by first identifying themselves by means of their finger impressions on the computer touch table 601. Unlike the configuration of FIG. 1, users are identified at any physical point on the surface of the table 601, according to the embodiments discussed herein.

Figure 7:
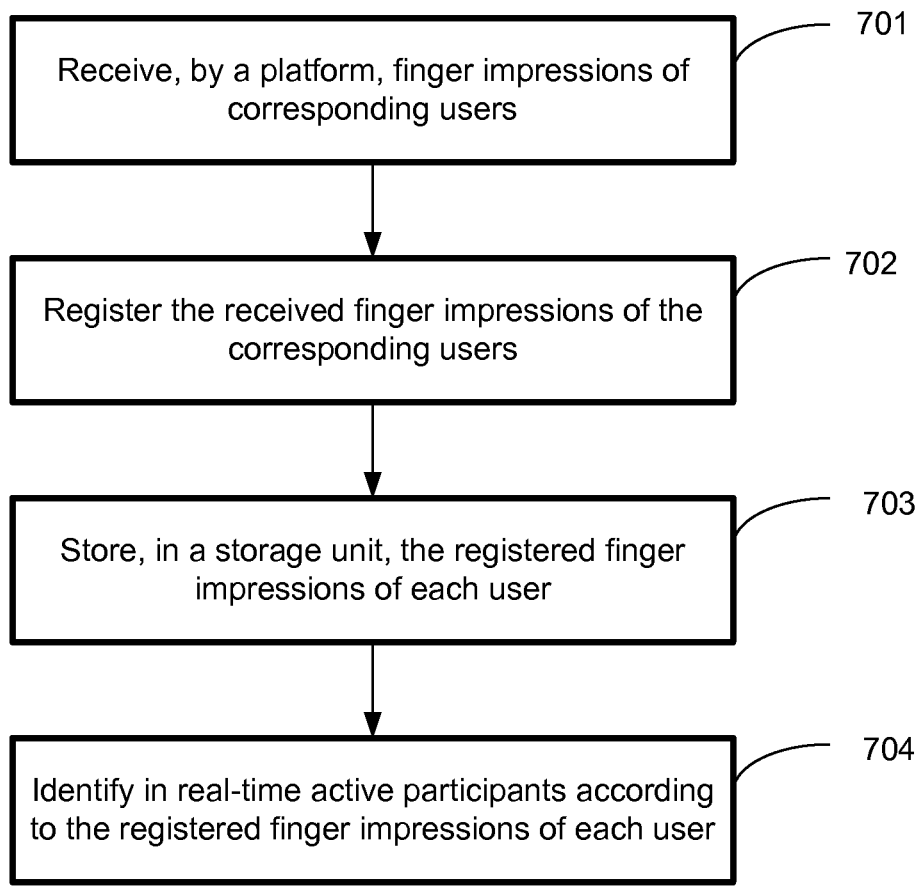
FIG. 7 is a high level method flowchart for real-time identification of multiple users on a computer touch platform, according to one embodiment of the invention.

FIG. 7 is a high level method flowchart 700 for real-time identification of multiple users on the computer touch platform 201/301/601, according to one embodiment of the invention. The method flowchart 700 is discussed with reference to FIGS. 2-6.

At block 701, the computer touch platform 201/301/601 receives finger impressions of one or more users to register those users. At block 702, the first logic unit 305 registers the received finger impression of the corresponding users. At block 703, the first logic unit 305 stores the registered finger impressions of each user in the storage unit 202. At block 704, the second logic unit 306 identifies in real-time active participants according to the registered finger impressions of each user.

Figure 8:
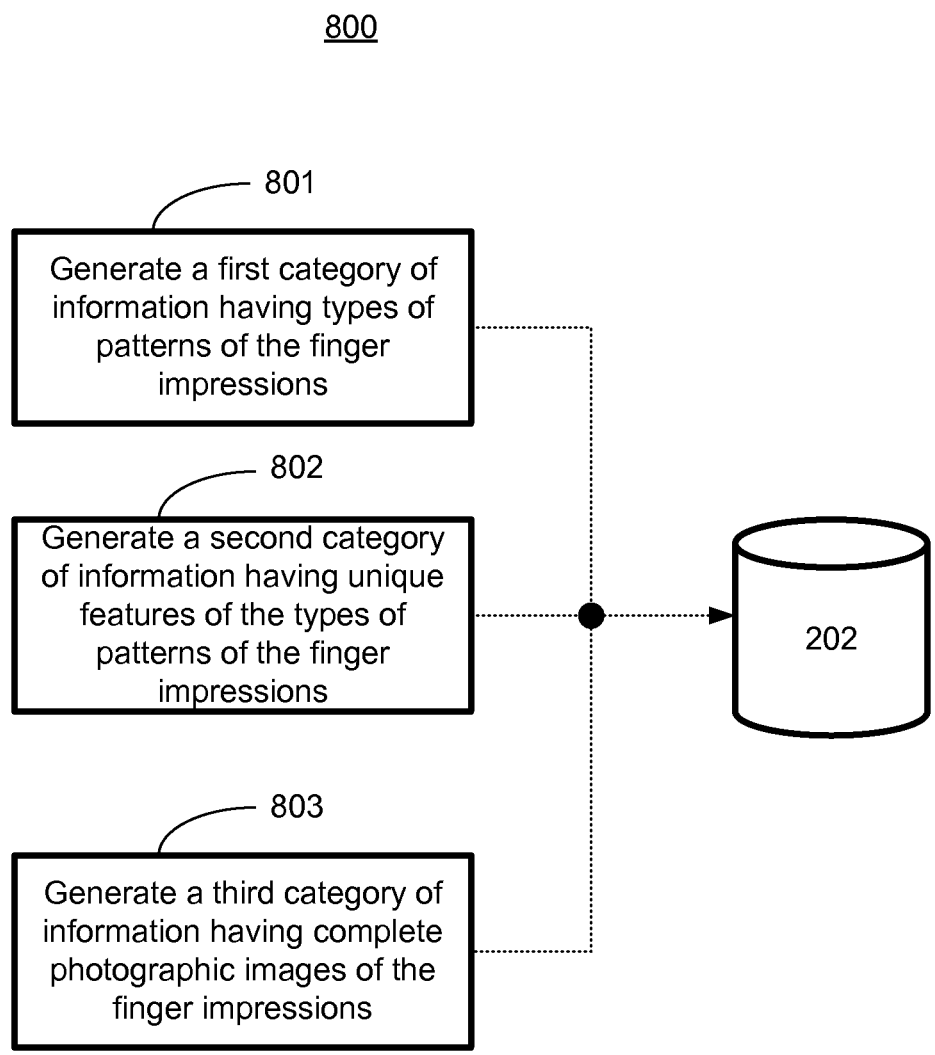
FIG. 8 is a high level method flowchart for registering multiple users on a computer touch platform, according to one embodiment of the invention.

FIG. 8 is a high level method flowchart 800 for registering (block 702 of FIG. 7) multiple users on a single computer touch platform 201/301/601, according to one embodiment of the invention. The method flow chart 800 is discussed with reference to FIGS. 2-6.

At block 801, the first logic unit 305 classifies the finger impressions received by the computer touch platform 201/301/601 as a first category of information having types of patterns of the finger impressions. At block 802, the first logic unit 305 classifies the received finger impressions as a second category of information having unique features of the types of patterns of the finger impressions. At block 803, the first logic unit 305 classifies the received finger impressions as a third category of information having complete photographic images of the finger impressions. The list of three categories of information is not an exclusive list of categories of information. In one embodiment, the first logic unit 305 classifies the received finger impressions in additional categories as shown in FIG. 5.

Referring back to FIG. 8, in one embodiment the first category of information having types of patterns of the finger impressions include Arch, Loop, and Whorl type patterns of the finger impressions. In one embodiment, the second category of information having unique features of the types of finger impressions include features such as ridge ending, bifurcation, dots, short ridge, etc. In one embodiment, the third category of information having complete photographic images of the finger impressions includes flat and rolled off images of the finger impression. Flat images are taken when the user finger is pressed flat on the computer touch platform 301. Rolled off images of the finger impressions are taken when the user finger is rolled right and/or left along the surface of the computer touch platform 301.

Figure 9:
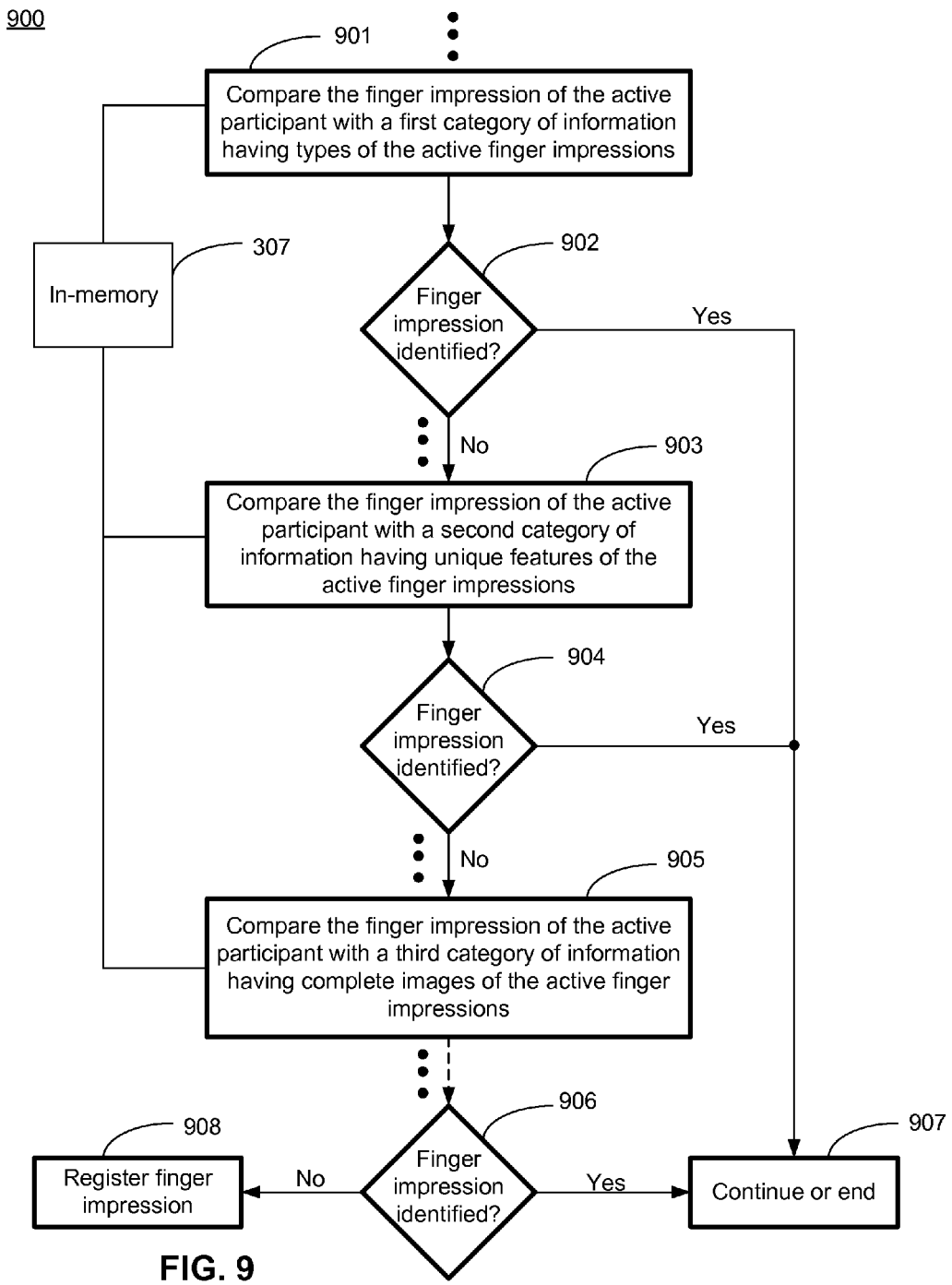
FIG. 9 is a high level method flowchart for identifying each user among the multiple users of a computer touch platform by means of a hierarchical comparison approach, according to one embodiment of the invention.

FIG. 9 is a high level method flowchart 900 for identifying each user among the multiple users of the computer touch platform 201/301/601 by means of a hierarchical comparison approach, according to one embodiment of the invention. The method flowchart 900 is discussed with reference to FIGS. 2-6.

At block 901, the comparison logic unit 404 compares the received finger impression of the active participant with the first category (Category A) of information having types of the active finger impressions stored in the fast access memory 307. The dots in FIG. 9 prior to block 901, and other dots in the same figure, represent that the embodiments of the invention are configured to compare the finger impressions with any category of information that results in the fastest identification of the users. For example, when finger impressions are colors, then comparing the received finger impression of the active participant with the fifth category (Category E) of information is performed prior to comparing the finger impression of the active participant with the first category of information.

At block 902, a determination is made whether a match is found for the received finger impression of the active participant. If a match is found, then at block 907 the user is allowed to participate/interact with the executing application. If no match is found, then the received finger impression is compared with another category of information.

At block 903, the comparison logic unit 404 compares the received finger impression of the active participant with the second category (Category B) of information having unique features of the active finger impressions. At block 904, a determination is made whether a match is found for the received finger impression of the active participant. If a match is found, then at block 907 the user is allowed to participate/interact with the executing application. If no match is found, then the received finger impression is compared with another category of information.

At block 905, the comparison logic unit 404 compares the received finger impression of the active participant with the third category (Category C) of information having complete photographic images of the active finger impressions. At block 906, a determination is made whether a match is found for the received finger impression of the active participant. If a match is found, then at block 907 the user is allowed to participate/interact with the executing application. If no match is found, then the received finger impression is compared with another category of information. In one embodiment, if no match is found then at block 908 the user is requested to register before interacting with the computer touch platform 201/301/601.

While the flowchart 900 illustrates how categories A-C of FIG. 5 are used for finger impression identification/recognition, other categories of information (e.g., categories D-E of FIG. 5) can be added at any point in the flowchart 900 for real-time identification.

Figure 10:
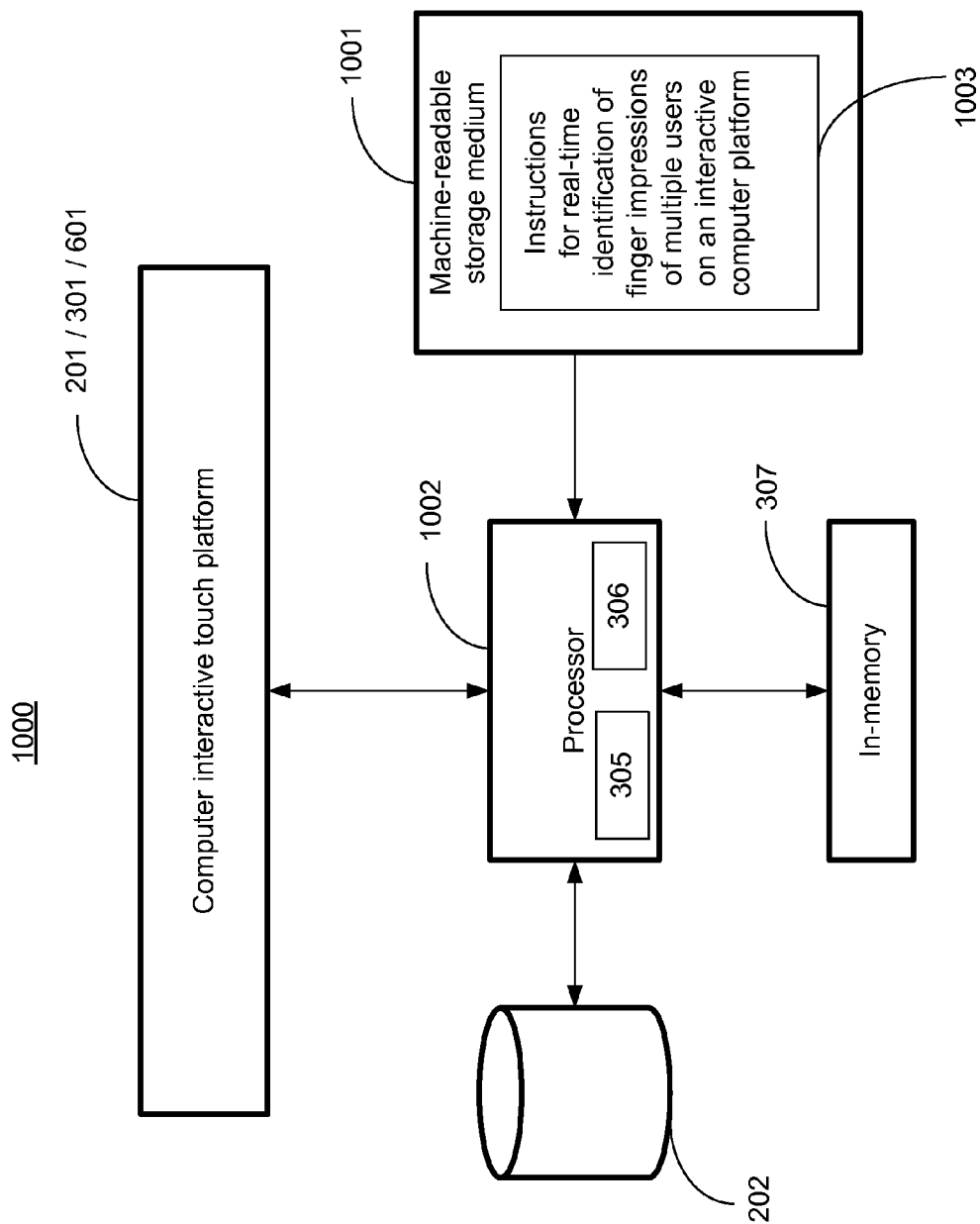
FIG. 10 illustrates high level logic components having a machine-readable medium with computer executable instructions for identifying each user among the multiple users of a computer touch platform, according to one embodiment of the invention.

FIG. 10 illustrates high level logic 1000 components having machine-readable medium 1001 with computer executable instructions (e.g., instructions to implement the flowcharts of FIGS. 6-8) for identifying each user among the multiple users of the computer touch platform 201/301/601, according to one embodiment of the invention. Elements of embodiments are provided as a machine-readable medium for storing the computer-executable instructions. In one embodiment, the machine-readable medium 1001 may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

In one embodiment, the machine readable instructions 1001 are executed by a processor 1002 which comprises the first and second logic units 305 and 306 respectively. As discussed above, the first logic unit 305 of the processor 1002 registers the finger impressions of the user and stores the registered finger impressions in the storage unit 202. The second logic unit 306 of the processor 1002 performs the real-time identification/recognition of finger impressions of active participants by comparing the finger impressions with the ones stored in the fast memory 307.

Figure 11:
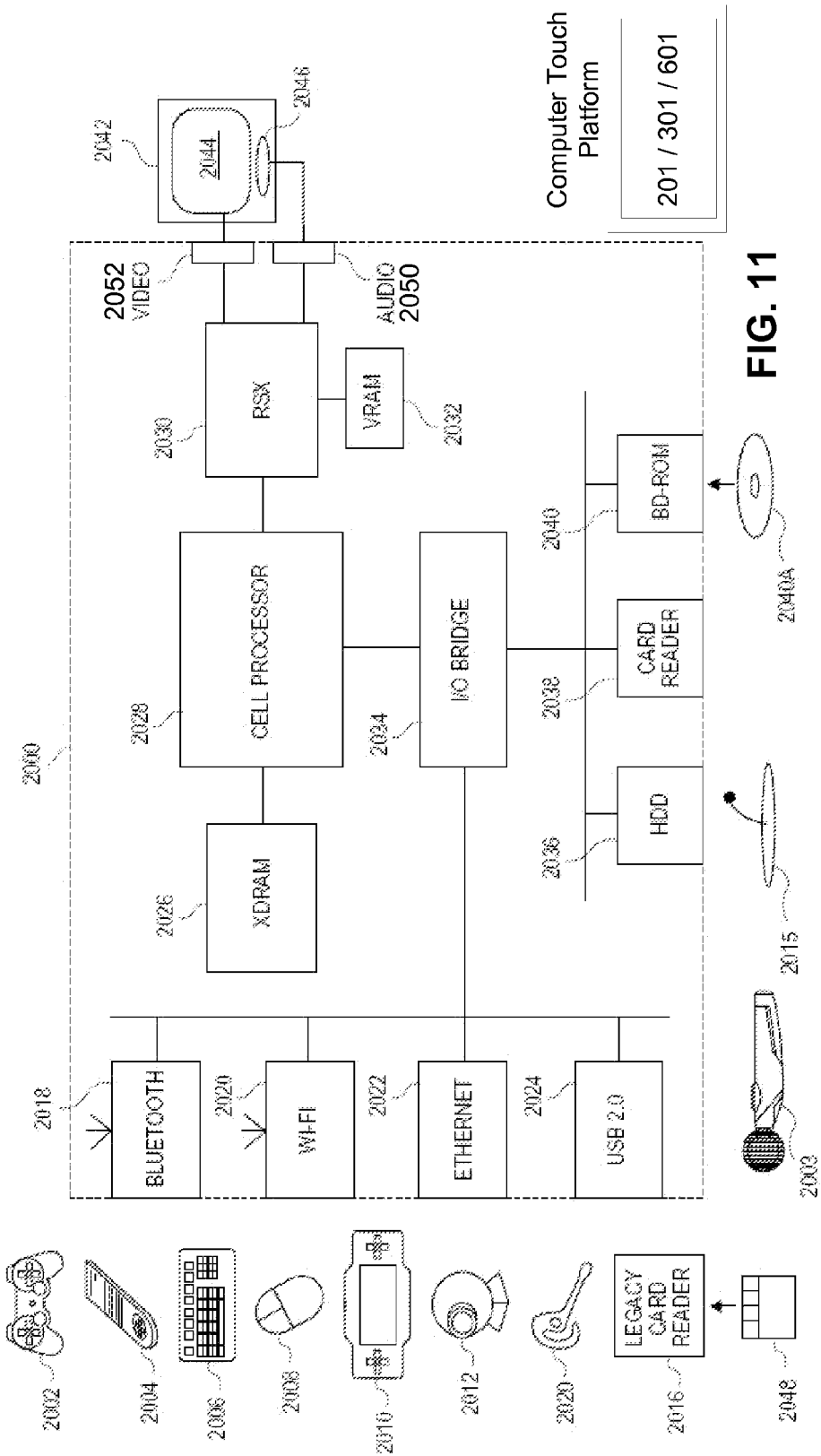
FIG. 11 is a system level computing environment for real-time identification of multiple users on a computer touch platform, according to one embodiment of the invention.

FIG. 11 is a system level computing environment for real-time identification of multiple users on a single computer touch platform, according to one embodiment of the invention. In one embodiment, FIG. 11 illustrates hardware and user interfaces that may be used to adapt a display based on object tracking, in accordance with one embodiment of the present invention. FIG. 11 schematically illustrates the overall system architecture of the Sony Playstation® 3 entertainment device, a console that may be compatible for real-time identification of finger impressions on a computer touch platform 201/301/601 as discussed with reference to FIGS. 2-10, according to one embodiment of the invention.

In one embodiment, a platform unit 2000 is provided, with various peripheral devices connectable to the platform unit 2000. In one embodiment, the platform unit 2000 comprises: a Cell® processor 2028; a Rambus® dynamic random access memory (XDRAM) unit 2026; a Reality Simulator graphics unit 2030 with a dedicated video random access memory (VRAM) unit 2032; and an I/O bridge 2034. In one embodiment, the platform unit 2000 also comprises a Blu Ray® Disk BD-ROM® optical disk reader 2040 for reading from a disk 2040A and a removable slot-in hard disk drive (HDD) 2036, accessible through the I/O bridge 2034. In one embodiment, the platform unit 2000 also comprises a memory card reader 2038 for reading compact flash memory cards, Memory Stick® memory cards and the like, which is similarly accessible through the I/O bridge 2034.

In one embodiment, the I/O bridge 2034 connects to multiple Universal Serial Bus (USB) 2.0 ports 2024; a gigabit Ethernet port 2022; an IEEE 802.11b/g wireless network (Wi-Fi) port 2020; and a Bluetooth® wireless link port 2018 capable of supporting of up to seven Bluetooth connections.

In operation, the I/O bridge 2034 handles all wireless, USB and Ethernet data, including data from one or more game controllers 2002. For example when a user is playing a game, the I/O bridge 2034 receives data from the game (motion) controller 2002 via a Bluetooth link and directs it to the Cell® processor 2028, which updates the current state of the game accordingly.

In one embodiment, the wireless USB and Ethernet ports also provide connectivity for other peripheral devices in addition to game controller 2002, such as: a remote control 2004; a keyboard 2006; a mouse 2008; a portable entertainment device 2010 such as a Sony Playstation® Portable entertainment device; a video image sensor such as an Playstation® Eye video image sensor 2012; a microphone headset 2020; a microphone array 2015, Sony Motion® controller 2003, card reader 2016, memory card 2048 for the card reader 2016. Such peripheral devices may therefore in principle be connected to the platform unit 2000 wirelessly; for example the portable entertainment device 2010 may communicate via a Wi-Fi ad-hoc connection, while the microphone headset 2020 may communicate via a Bluetooth link.

The provision of these interfaces means that the Sony Playstation 3® device is also potentially compatible with other peripheral devices such as digital video recorders (DVRs), set-top boxes, digital video image sensors, portable media players, Voice over IP telephones, mobile telephones, printers and scanners.

In one embodiment, the game controller 2002 is operable to communicate wirelessly with the platform unit 2000 via the Bluetooth® link, or to be connected to a USB port, thus also providing power by which to charge the battery of the game controller 2002. In one embodiment, the game controller 2002 also includes memory, a processor, a memory card reader, permanent memory such as flash memory, light emitters such as LEDs or infrared lights, microphone and speaker, a digital video image sensor, a sectored photodiode, an internal clock, a recognizable/identifiable shape such as a spherical section facing the game console.

In one embodiment, the game controller 2002 is configured for three-dimensional location determination. Consequently gestures and movements by the user of the game controller 2002 may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or the like.

In one embodiment, the remote control 2004 is also operable to communicate wirelessly with the platform unit 2000 via a Bluetooth link. The remote control 2004 comprises controls suitable for the operation of the Blu Ray™ Disk BD-ROM reader 2040 and for the navigation of disk content.

The Blu Ray™ Disk BD-ROM reader 2040 is operable to read CD-ROMs compatible with the Playstation and PlayStation 2 devices, in addition to conventional pre-recorded and recordable CDs, and so-called Super Audio CDs. The reader 2040 is also operable to read DVD-ROMs compatible with the Playstation 2 and PlayStation 3 devices, in addition to conventional pre-recorded and recordable DVDs. The reader 2040 is further operable to read BD-ROMs compatible with the Playstation 3 device, as well as conventional pre-recorded and recordable Blu-Ray Disks.

The platform unit 2000 is operable to supply audio and video, either generated or decoded by the Playstation 3 device via the Reality Simulator graphics unit 2030, through audio and video connectors to a display and sound output device such as, the display 201/301/601. The audio connectors 2050 may include conventional analogue and digital outputs while the video connectors 2052 may variously include component video, S-video, composite video and one or more High Definition Multimedia Interface (HDMI) outputs. Consequently, video output may be in formats such as PAL or NTSC, or in 720p, 1080i or 1080p high definition.

In one embodiment, the video image sensor 2012 comprises a single charge coupled device (CCD) and an LED indicator. In some embodiments, the image sensor 2012 includes software and hardware-based real-time data compression and encoding apparatus so that compressed video data may be transmitted in an appropriate format such as an intra-image based MPEG (motion picture expert group) standard for decoding by the platform unit 2000. In one embodiment, the video image sensor LED indicator is arranged to illuminate in response to appropriate control data from the platform unit 2000, for example to signify adverse lighting conditions.

Embodiments of the video image sensor 2012 may variously connect to the platform unit 2000 via an HDMI, USB, Bluetooth® or Wi-Fi communication port. Embodiments of the video image sensor may include one or more associated microphones and may also be capable of transmitting audio data. In embodiments of the video image sensor, the CCD may have a resolution suitable for high-definition video capture. In one embodiment, images captured by the video image sensor may for example be incorporated within a game or interpreted as game control inputs. In another embodiment the video image sensor is an infrared video image sensor suitable for detecting infrared light.

In one embodiment, the platform unit 2000 is operable to communicate with the computer touch platform 201/301/601 via any of the communicating means discussed above.

Figure 12:
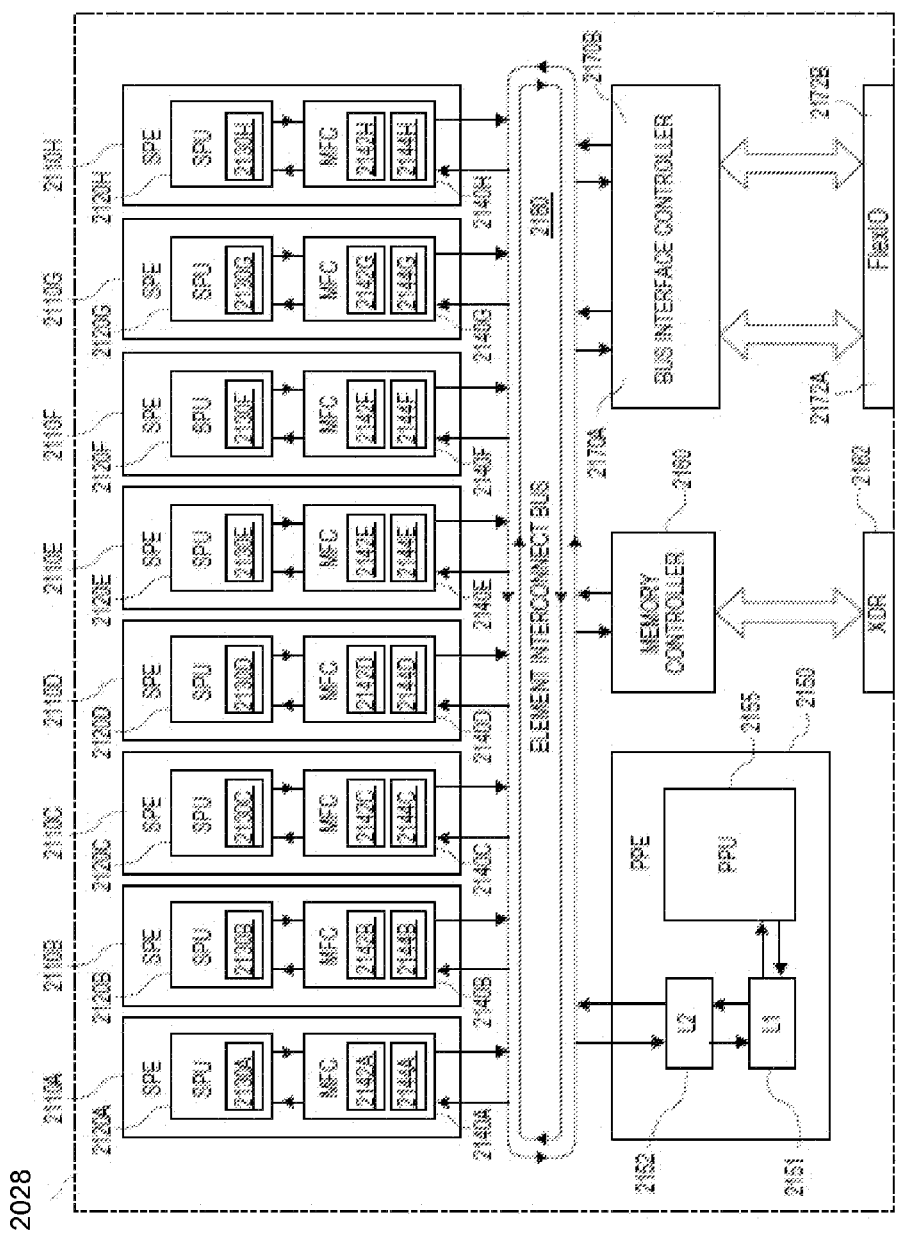
FIG. 12 is a system level computing environment for real-time identification of multiple users on a computer touch platform, according to one embodiment of the invention.

FIG. 12 is a system level computing environment for real-time identification of multiple users on the computer touch platform 201/301/601, according to one embodiment of the invention. FIG. 12 illustrates additional hardware that may be used to process instructions, in accordance with one embodiment of the present invention. In one embodiment, the Cell® processor 2128 of FIG. 11, as further illustrated in FIG. 12, comprises four basic components: external input and output structures comprising a memory controller 2160 and a dual bus interface controller 2170A, B; a main processor referred to as the Power Processing Element 2150; eight co-processors referred to as Synergistic Processing Elements (SPEs) 2110A-H; and a circular data bus connecting the above components referred to as the Element Interconnect Bus 2180.

In one embodiment, the Power Processing Element (PPE) 2150 is based upon a two-way simultaneous multithreading Power 2070 compliant PowerPC core (PPU) 2155 running with an internal clock of 3.2 GHz. It comprises a 512 kB level 2 (L2) cache 2152 and a 32 kB level 1 (L1) cache 2151. The PPE 2150 is capable of eight single position operations per clock cycle, translating to 25.6GFLOPs at 3.2 GHz. The primary role of the PPE 2150 is to act as a controller for the SPEs 2110A-H, which handle most of the computational workload. In operation the PPE 2150 maintains a job queue, scheduling jobs for the SPEs 2110A-H and monitoring their progress. Consequently each SPE 2110A-H runs a kernel whose role is to fetch a job, execute it and synchronized with the PPE 2150.

In one embodiment, each Synergistic Processing Element (SPE) 2110A-H comprises a respective Synergistic Processing Unit (SPU) 2120A-H, and a respective Memory Flow Controller (MFC) 2140A-H comprising in turn a respective Dynamic Memory Access Controller (DMAC) 2142A-H, a respective Memory Management Unit (MMU) 2144A-H and a bus interface (not shown). Each SPU 2120A-H is a RISC processor having local RAM 2130A-H.

In one embodiment, the Element Interconnect Bus (EIB) 2180 is a logically circular communication bus internal to the Cell processor 2028 which connects the above processor elements, namely the PPE 2150, the memory controller 2160, the dual bus interface controller 1570A, B and the 8 SPEs 2110A-H, totaling 12 participants. Participants can simultaneously read and write to the bus at a rate of at least 8 bytes per clock cycle. As noted previously, each SPE 2110A-H comprises a DMAC 2142A-H for scheduling longer read or write sequences. The EIB comprises four channels, two each in clockwise and anti-clockwise directions. Consequently for twelve participants, the longest step-wise data-flow between any two participants is six steps in the appropriate direction.

In one embodiment, the memory controller 2160 comprises an XDRAM interface 2162 through which the memory controller interfaces with XDRAM. The dual bus interface controller 2170A, B comprises a system interface 2172A, B.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an" "additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. The embodiments of the invention are intended to embrace all such alternatives, modifications, and variations as to fall within the broad scope of the appended claims.

I claim:

1. An apparatus comprising:
a storage unit;
an interactive computer platform to receive finger impressions of corresponding multiple users when the multiple users press their fingers on the interactive computer platform;
a first logic unit coupled to the interactive computer platform to register the finger impressions of corresponding multiple users, and to store the registered finger impressions of each user among the multiple users in the storage unit;
an in-memory to store a copy, from the storage unit, of the stored, registered finger impressions; and
a second logic unit coupled to the storage unit to identify in real-time active participants according to the copy of the stored, registered finger impressions via a comparison logic unit which is to compare a finger impression of an active participant from the active participants with the copy of the stored, registered finger impressions in the in-memory, wherein the comparison logic unit is to compare the finger impression of the active participant with at least three categories of information of the registered finger impressions, comprising:
a first category of information having types of patterns of the finger impressions;
a second category of information having unique features of the types of patterns of the finger impressions, wherein the second category of information is compared with the finger impression of the active participant in response to no match being found in the first category of information; and
a third category of information having complete photographic images of the finger impressions, wherein the third category of information is compared with the finger impression of the active participant in response to no match being found in the second category of information.

2. The apparatus of claim 1, wherein the first logic unit to register the received finger impressions of the corresponding multiple users by categorizing information about the finger impressions of each user among the multiple users in a hierarchical view of the first category, the second category, and the third category.

3. The apparatus of claim 1, wherein the interactive computer platform comprise a touch pad to receive the finger impression via sensors, the sensors being one of or a combination of:
optical sensors;
ultrasonic sensors;
passive capacitance sensors; and
active capacitance sensors.

4. The apparatus of claim 1, wherein the interactive computer platform comprises a touch pad and is to take a photographic image of each finger impression of the finger impressions of the corresponding multiple users.

5. The apparatus of claim 1, wherein the finger impressions being one of or a combination of:
fingerprints of the corresponding multiple users;
texture of a covering on fingers of the corresponding multiple users;
color of the fingers of the corresponding multiple users; and
temperature of the fingers of the corresponding multiple users.

6. A method comprising:
receiving, by an interactive computer platform, finger impressions of corresponding multiple users when the users press their fingers on the interactive computer platform;
registering the received finger impressions of the corresponding multiple users;
storing the registered finger impressions of each user among the multiple users in a storage unit;
storing a copy of the stored, registered finger impressions to an in-memory; and
identifying in real-time active participants according to the stored, registered finger impressions, wherein identifying in real-time the active participants comprises comparing a finger impression of an active participant from the active participants with a copy of the finger impressions in the in-memory, and wherein comparing the finger impression of the active participant with the copy of the finger impressions in the in-memory comprises:
comparing the finger impression of the active participant with a first category of information of the registered finger impression, the first category having types of patterns of the finger impressions;
comparing the finger impression of the active participant with a second category of information of the registered finger impression in response to no match being found in the first category of information, the second category of information having unique features of the types of patterns of the finger impressions; and
comparing the finger impression of the active participant with a third category of information of the registered finger impression in response to no match being found in the second category of information, the third category of information having complete photographic images of the finger impressions.

7. The method of claim 6, wherein registering the received finger impressions comprises categorizing information about the finger impressions of each user among the multiple users in a hierarchical view.

8. The method of claim 7, wherein categorizing the information comprises:
generating a first category of information having types of patterns of the finger impressions;
generating a second category of information having unique features of the types of patterns of the finger impressions; and
generating a third category of information having complete photographic images of the finger impressions.

9. The method of claim 6, wherein the finger impressions being one of or a combination of:
fingerprints of the corresponding multiple users;
texture of a covering on fingers of the corresponding multiple users;
color of the fingers of the corresponding multiple users; and
temperature of the fingers of the corresponding multiple users.

10. A system comprising:
a touch pad to receive finger impressions of corresponding multiple users when the multiple users press their fingers on the touch pad;
a processor, coupled to the touch pad comprising:
a first logic unit to register the received finger impressions of the corresponding multiple users; and
a second logic unit to identify in real-time active participants according to the registered finger impressions of each user among the multiple users; and
a storage unit to store the registered finger impressions of each user among the multiple users;
an in-memory to store a copy, from the storage unit, of the stored, registered finger impressions; and
wherein the second logic unit to identify in real-time active participants via a comparison logic unit which is to compare a finger impression of an active participant from the active participants with the copy of the stored, registered finger impressions in the in-memory, wherein the comparison logic unit is to compare the finger impression of the active participant with at least three categories of information of the registered finger impressions, comprising:
a first category of information having types of patterns of the finger impressions;
a second category of information having unique features of the types of patterns of the finger impressions, wherein the second category of information is compared with the finger impression of the active participant in response to no match being found in the first category of information; and
a third category of information having complete photographic images of the finger impressions, wherein the third category of information is compared with the finger impression of the active participant in response to no match being found in the second category of information.

* * * * *